United States Patent
von Benningsen

[11] 3,722,898
[45] Mar. 27, 1973

[54] SEALING ARRANGEMENT
[75] Inventor: Gerd von Benningsen, Geisenbrunn, Post Gilching, Germany
[73] Assignee: Reinz Dichtungs-Gesellschaft, GmbH, Neu-Ulm/Donau, Germany
[22] Filed: May 11, 1971
[21] Appl. No.: 142,257

Related U.S. Application Data
[62] Division of Ser. No. 830,693, June 5, 1969, abandoned.

[30] Foreign Application Priority Data
June 6, 1968 Germany..................P 17 50 805.3

[52] U.S. Cl..................................277/206, 277/236
[51] Int. Cl. ............................................B65d 53/00
[58] Field of Search....277/206, 206.1, 212 C, 235 B, 277/236

[56] References Cited

UNITED STATES PATENTS

| 3,313,553 | 4/1967 | Gastineau........................277/236 X |
| 3,433,490 | 3/1969 | Teucher et al. ................277/235 B X |
| 3,519,278 | 7/1970 | Fuhrmann et al.............277/235 B X |

FOREIGN PATENTS OR APPLICATIONS

| 246,554 | 1/1926 | Great Britain.....................277/206.1 |

Primary Examiner—Meyer Perlin
Assistant Examiner—Ronald C. Capossela
Attorney—Michael S. Striker

[57] ABSTRACT

A sealing arrangement for establishing a seal between two juxtaposed surfaces. A first annular sealing element of solid cross-section and of a hard material is accommodated in the hollow of a second annular sealing element having a channel-shaped cross-section. The two elements are in axial registry with one another and have a predetermined combined axial thickness. The material of the second element is substantially softer than that of the first element so that pressure exerted upon the device by movement of one of the surfaces towards the other results in deformation of the softer second sealing element with concomitant reduction of the axial thickness and penetration of the harder first sealing element into the material of the softer second sealing element.

10 Claims, 7 Drawing Figures

SEALING ARRANGEMENT

CROSS-REFERENCES TO RELATED APPLICATIONS

The present application is a division of my previous application, Ser. No. 830,693, filed on June 5, 1969 under the title "SEALING ARRANGEMENT" and now abandoned.

BACKGROUND OF THE INVENTION

The present invention relates to sealing arrangements in general, and more particularly to a sealing arrangement for establishing a seal between two juxtaposed surfaces.

Seals of this type are required in many applications, an important one of which is the sealing of apertures in the juxtaposed surfaces of a cylinder block and the cylinder head of an internal combustion engine. In this particular type of sealing arrangement it is known to dispose a sealing gasket of elastically compressible material between the juxtaposed surfaces of the cylinder head and the cylinder block, which sealing gasket is provided with one or more cut-outs registering with the openings provided in the juxtaposed surfaces of the cylinder block and the cylinder head. In this type of construction it is already known to provide what I shall hereafter designate as primary sealing devices, which are of annular configuration and are received in the cut-outs of the sealing gasket, surrounding the apertures in the juxtaposed surfaces of the cylinder head and the cylinder block. They consist of rings of relatively hard material which are either separate from or in suitable manner secured to the compressible sealing gasket.

The problem with this type of sealing arrangement known from the prior art is that is has always been either necessary to exactly match the axial thickness of these primary sealing rings with the thickness of the compressible gasket, to provide exceptionally high pressures upon the cylinder head in order to deform the primary sealing devices to such an extent as to reduce their axial thickness so that it matches that of the compressible sealing gasket, or that the juxtaposed sealing surfaces of the cylinder head and the cylinder block were damaged as a result of the pressures exerted.

Basically, these known primary sealing devices may either be considered as serving to provide a preliminary seal in addition to that provided by the compressible sealing gasket or as a back-up measure in case the sealing action of the gasket should deteriorate as a result of damage, or they may also serve to prevent portions of the gasket from moving across the apertures in the juxtaposed surfaces of the cylinder block and cylinder head when the gasket is deformed in response to tightening of the cylinder head on the cylinder block. In so far as the primary sealing devices serve for preliminary sealing purposes they require very high sealing pressures, that is very high pressures must be exerted between the juxtaposed sealing surfaces of the cylinder block and the cylinder head. This brings with it significant problems. Thus, primary sealing devices or sealing rings serving for preliminary sealing purposes and being of solid metallic cross-section, have initially on axial compression a very steep characteristic line, which is to say that even to obtain minute axial compression it is necessary to exert very high pressures. These pressures, which may be in excess of 2,000 kp/cm$^2$, merge eventually into an even steeper characteristic line, that is the characteristic line becomes even steeper after an initial minute compression has been obtained. For this reason it is necessary that the axial thickness of such primary sealing rings is precisely matched to the thickness of the compressible sealing gasket in order to properly coordinate the necessary pressures. Because of the steep characteristic line it is necessary that exceedingly close tolerances be maintained in the manufacture of such primary sealing rings. This, coupled with the fact that the entire construction of a combustion engine utilizing such primary sealing rings must be very rigid and able to withstand the sealing pressures which are required, so as to avoid warping of the cylinder sleeves as a result of differential pressures along the margin of the various apertures, is evidently a cause of increased manufacturing expenses.

Other primary sealing rings which are known exhibit a pronounced springiness. However, these can be used only for limited applications because the spring elements which they utilize are subject to breakage, for instance under the influence of varying stresses resulting from engine vibrations. Evidently, if the spring elements in such primary sealing rings break, the necessary pressure needed for the desired sealing action will disappear. Furthermore, the sealing pressures which can be obtained with such constructions are relatively small. They do, however, have the advantage that they can readily conform themselves to deformations and thickness tolerances of the compressible sealing gasket. Because of their flat characteristic line, obtained in response to compression of such rings, the sealing pressure exerted in the region of such rings varies only slightly as a result of differential thickness of the compressible sealing gasket.

It is also known to provide primary sealing devices in form of cutting or penetrating rings which, when requisite pressure is exerted, will penetrate into the material of the juxtaposed sealing surfaces of the cylinder block and the cylinder head themselves. This is particularly true where the cylinder head consists of aluminum or a similar light metal. However, the use of this type of primary sealing ring evidently results in damage to the juxtaposed sealing surfaces and calls into question the reliability of a seal which can be obtained if the initial seal has once been broken and resealing becomes necessary. In addition to this use of this type of primary sealing ring is possible only with certain types of materials on the cylinder head and/or block, that is the materials at least of the juxtaposed sealing surfaces on these components must be capable of being penetrated by the primary sealing ring.

SUMMARY OF THE INVENTION

It is a general object of the present invention to overcome the aforementioned disadvantages.

More particularly, it is an object of the present invention to provide a sealing arrangement which is not possessed of these disadvantages.

Still more specifically it is an object of the present invention to provide such a sealing arrangement which does not require and does not result in any damage to the juxtaposed sealing surfaces between which it is to establish a seal.

A further object of the invention is to provide such a sealing arrangement wherein the necessary sealing action can be obtained with moderate sealing pressures and is, within wide ranges of tolerances, uninfluenced by differences in the thickness of the compressible sealing gasket.

A concomitant object of the invention is to provide such a sealing arrangement which is entirely independent of any considerations relative to the material of the sealing surfaces between which seal is to be established.

A further object of the invention is to provide a sealing arrangement of the type in question which reduces vibrations in the region of the seal.

Still another object of the invention is to provide such a sealing arrangement which provides for excellent seal-tightness with even pressure distribution at all points.

In pursuance of the above objects, and others which will become apparent hereafter, one feature of my invention resides in the provision of a sealing arrangement for establishing a seal between two juxtaposed surfaces. Briefly stated, my novel sealing arrangement includes a sealing device comprising a first annular sealing element, and a second annular sealing element which is in axial registry with the first sealing element. Together the sealing elements have a predetermined combined axial thickness and are arranged to be interposed between the juxtaposed surfaces between which the seal is to be established. The first sealing element consists of a material which is substantially harder than that of the second sealing element so that, in response to movement of one of the surfaces toward the other and into sealing contact with the device, the second sealing element is deformed under concomitant reduction of the predetermined axial thickness and penetration of the first sealing element into the material of the second sealing element.

The form, thickness and material of the first and second sealing elements are so coordinated with one another that the first sealing element of harder material will penetrate into the material of the second sealing element, but will not penetrate through the second sealing element. The deformation occurs exclusively, or substantially exclusively in the material of the second sealing element which is softer than that of the first sealing element. The hardness of the first sealing element is to selected that the sealing pressure results in no or substantially no deformation of the first sealing element.

According to the invention the minimum hardness is on the order of 35 kp/mm$^2$, preferably higher, for instance up to 140 kp/mm$^2$ tensile strength which is to be found for instance in piano wire. I have obtained good results by using a steel having a tensile strength of 90 kp/mm$^2$.

The softer material of the second sealing element, which advantageously is metal, may be copper, aluminum or another even softer metal. Preferably, however, the metal of which the second sealing element is constituted is harder than copper and may for instance be a steel of low minimum hardness.

I have found that if I use a steel having a tensile strength of 90 kp/mm$^2$ for the first sealing element, then my composite construction yields very good results if for the second sealing element I use a steel having a strength of substantially 35 kp/mm$^2$ if the thickness of the second sealing element in the area where it is penetrated by the first sealing element is greater than the diameter of the first sealing element.

In the currently preferred embodiment of my invention, the first annular sealing element constitutes a core of solid cross-section and of hard metal, particularly steel wire, and the second annular sealing element is configurated to embrace the core, for instance by being of channel-shaped cross-section, such as of U-shaped cross-section, and will consist of a softer metal, for instance copper. I prefer to connect the device according to my invention with a compressible sealing gasket. This is not, however, necessary.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 5:
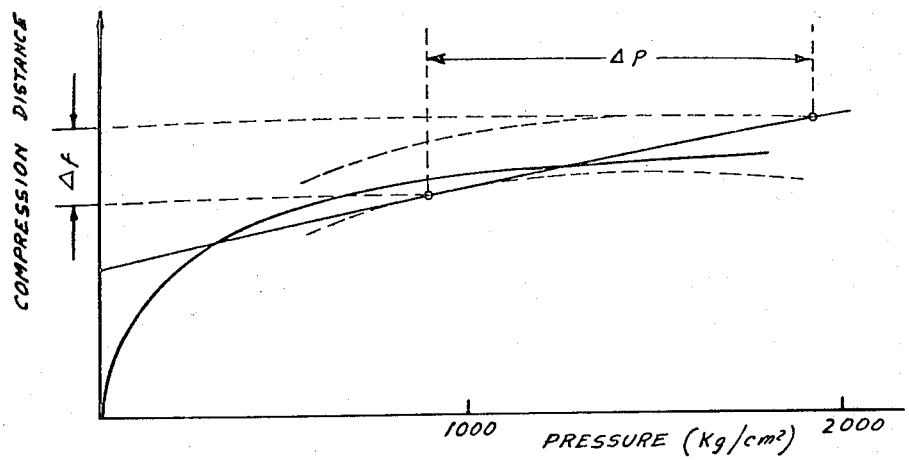
FIG. 5 is a graph showing the compression characteristics of one type of prior-art sealing device of the type in question.
Figure 6:
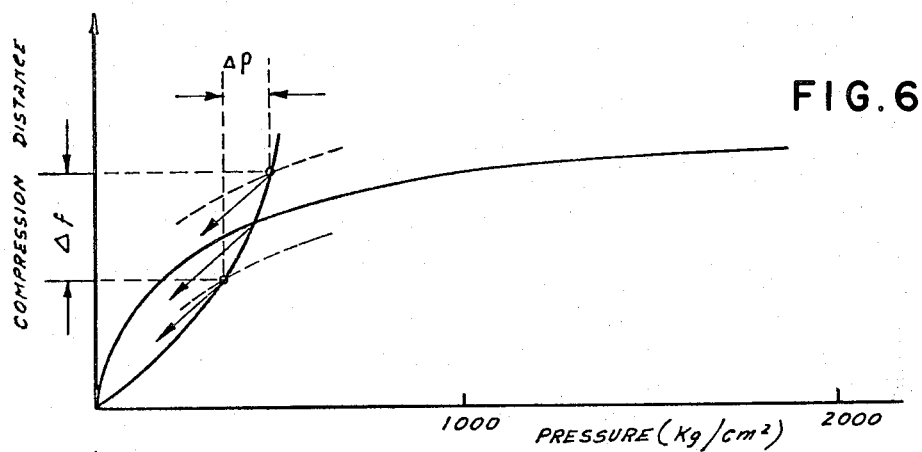
FIG. 6 is a graph similar to FIG. 5 but showing the compression characteristics of another type of prior-art sealing device.
Figure 7:
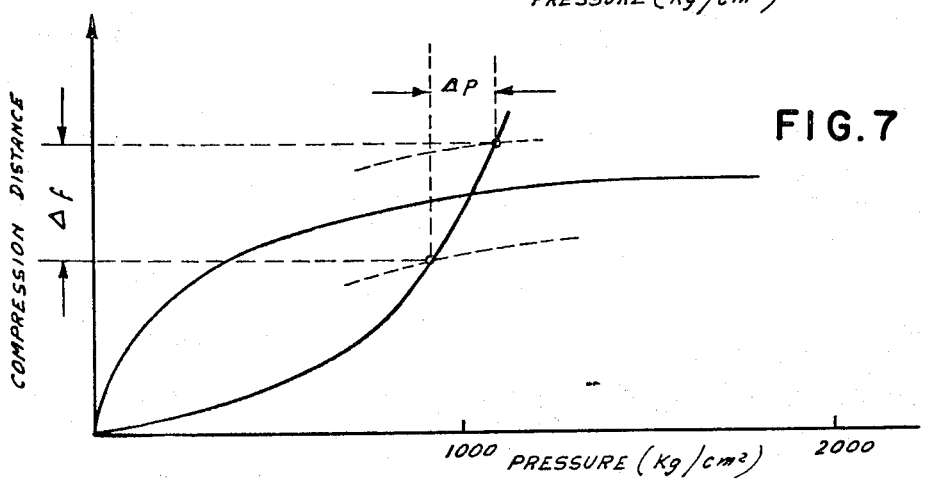
FIG. 7 is a further graph showing the compression characteristics of the construction according to the present invention.

With the exception of the graphs in FIGS. 5, 6 and 7, all other Figures are fragmentary axial sections through annular sealing devices according to my invention. Their identification as being of annular configuration is thought to adequately define their overall configuration without requiring the illustration of any of the various embodiments in a complete plan view or perspective view.

In the introductory comments some prior-art sealing devices of the type under discussion have been identified. Thus, it was mentioned that it is known to provide sealing rings consisting of hard material and being of solid cross-sectional configuration. The problems encountered with such sealing rings were outlined. FIG. 5 shows in form of a graph the relationship between the pressure P—expressed in kg/cm$^2$—and the compression distance $f$, that is the extent to which such ring are compressed at a given pressure P. The steepness of the characteristic compression line of such rings is readily evident from FIG. 5.

The graph in FIG. 6 illustrates spring-loaded sealing rings of the type which were also discussed in the introductory comments. Again, the compression pressure P is expressed in kg/cm² and the compression distance is expressed by the symbol $f$.

The graph in FIG. 7, on the other hand, shows the same relationships as in FIGS. 5 and 6 but for a construction according to the present invention. The compression pressure P is again expressed in kg/cm² and the compression distance with the symbol $f$. It is emphasized that by accommodating the materials of the different components of my construction to one another, and by accommodating the structural characteristics of the different components, the P/$f$ function can be influenced within a wide range and is independent of the materials of the sealing surfaces between which a seal is to be established. Evidently, by influencing the P/$f$ function it is possible to accommodate the sealing device to the thickness of the compressible sealing gasket where necessary. Furthermore, my novel sealing device provides for a significant reduction in vibrations in apparatus where it is used. So-called "settling" which in other constructions may occur subsequent to tightening of the pressure-exerting instrumentalities until the requisite sealing pressure is reached, can be eliminated to all intents and purposes by properly selecting the P/$f$ function in the device according to the present invention, and this of course eliminates the loss of sealing pressure against the juxtaposed pressure surfaces.

Figure 1:
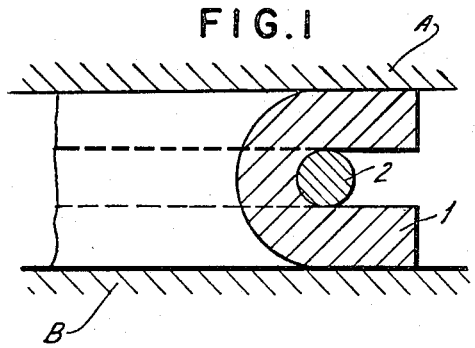
FIG. 1 is a fragmentary axial section through one embodiment of my invention.
Figure 2:
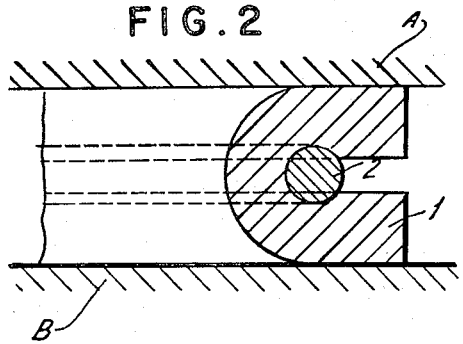
FIG. 2 shows the embodiment of FIG. 1 in compressed state.

Discussing now the various embodiments illustrated in the drawing, and firstly that of FIGS. 1 and 2, it will be seen that reference numeral 1 identifies an annular element which is disposed between two juxtaposed sealing surfaces A and B one of which can be moved towards the other, or both of which can be moved towards one another to obtain the requisite sealing pressure. Such sealing surfaces A and B may be provided on a cylinder block and a cylinder head, for instance. In the embodiment of FIGS. 1 and 2 the element 1 is of channel-shaped cross-section having an open side facing radially outwardly. Located within the open side is an additional annular sealing element 2 which here is of circular and solid cross-section and consists of a material which is considerably harder than that of the annular sealing element 1. A comparison of elements 1 and 2 shows that the diameter of element 1 substantially equals the wall thickness of element 2. FIG. 2 shows how, if sealing pressure is exerted between the surfaces A and B upon the device consisting of the elements 1 and 2, the axial thickness of the device will be reduced with tne annular sealing element 2 penetrating into the softer material of the annular sealing element 1 as shown.

Figure 3:
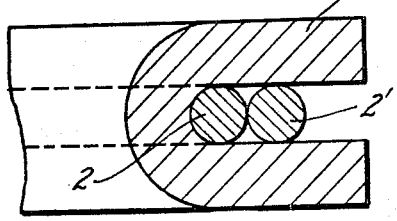
FIG. 3 is an embodiment analogous to but slightly different from the one shown in FIG. 1.

The embodiment illustrated in FIG. 3 is reminiscent of that in FIG. 1 except that here I utilize for the annular sealing element consisting of harder material, two discrete solid cross-section annular portions, identified with reference numerals 2 and 2' and consisting of steel wire or the like. With this construction the P/$f$ function is approximately linear but the operation will be stiffer than in the embodiment of FIG. 1. Of course, the two annular portions 2 and 2' provide two concentric sealing-contact lines which provides a so-called labyrinthine sealing effect.

Figure 4:
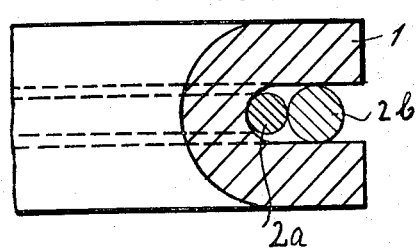
FIG. 4 is a view similar to FIG. 3 but showing a modified embodiment.

The embodiment in FIG. 4 is also rather similar to that in FIG. 3 except that the sealing portion 2b is the same as the one identified with reference numeral 2' in FIG. 3, while the sealing portion 2a is of smaller cross-section than the sealing portion 2 in FIG. 3. In this construction I obtain a progressive increase of the sealing pressure against the surfaces A and B (see FIG. 1) in response to axial compression of the device illustrated in FIG. 4. This is different from the results obtained in FIG. 3.

The present invention provides for a sealing device which can be readily used regardless of the thickness of the elastically compressible sealing gasket. Its use, particularly in conjunction with diesel engines, provides for reductions in the vibrations which are encountered and therefore significantly increases the sealing efficiency. It is in most cases unnecessary to subsequently tighten the cylinder head screws, that in subsequently to the initial tightening to effect sealing, because the so-called "setting action" which as discussed earlier will under most circumstances not occur when the device according to the present invention is used. The pressure distribution to the sealing surfaces, including those of the compressible sealing gasket, is significantly improved and this reduces the so-called secondary deformation in the compressible sealing gasket which in conventional constructions result from the different pressures acting upon it at different points.

The advantages obtained with the device according to the present invention were unattainable heretofore in the constructions known from the prior art. In fact, it was not even possible with the prior-art constructions to come close to these advantages.

It will be understood that each of the elements described above, or two or more together, may also find a useful application in other types of applications differing from the types described above.

While the invention has been illustrated and described as embodied in a sealing arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A sealing arrangement for establishing a seal between two juxtaposed surfaces, including a sealing device comprising an at least substantially incompressible first annular sealing element of solid cross-section; and a second annular sealing element in axial registry with and embracing said first sealing element, said sealing device having a predetermined axial thickness and being arranged to be interposed between said juxtaposed surfaces, said first sealing element consisting of a material substantially harder than that of said second sealing element whereby, in response to movement of one of said surfaces toward the other and into sealing contact with said device, said second sealing element is plastically deformed under concomitant permanent reduction of said predetermined axial thickness and penetration of said first sealing element into the material of said second sealing element undergoing plastic deformation.

2. A sealing arrangement as defined in claim 1, wherein said first sealing element consists of one piece.

3. A sealing arrangement as defined in claim 1, wherein said first sealing element is of at least substantially circular cross-section.

4. A sealing arrangement as defined in claim 1, wherein both of said sealing elements consists of metallic material.

5. A sealing arrangement as defined in claim 4, wherein said first sealing element consists of spring steel, and said second sealing element consists of a metallic material substantially more deformable than the material of said solid cross-section first sealing element.

6. A sealing arrangement as defined in claim 1, wherein said first sealing element consists of two concentric solid cross-section annular portions.

7. A sealing arrangement as defined in claim 6, wherein said annular portions are of at least substantially circular cross-section, and wherein one of said annular portions is of a diameter greater than that of the other annular portion.

8. A sealing arrangement as defined in claim 7, wherein said one annular portion surrounds the other annular portion radially outwardly thereof.

9. A sealing arrangement as defined in claim 1, wherein said second sealing element is of channel-shaped cross-section having an open side, and wherein said first sealing element is received through said open side.

10. A sealing arrangement as defined in claim 9, wherein said open side faces in radially outward direction of said second sealing element.

* * * * *